Sept. 8, 1942.  A. W. MALL  2,295,282
RESILIENT MOUNTING FOR ABRASIVE WHEELS
Filed May 31, 1940
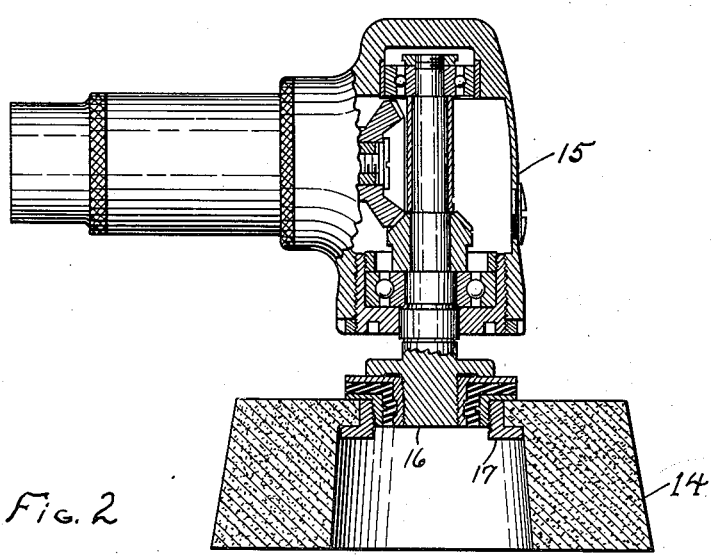
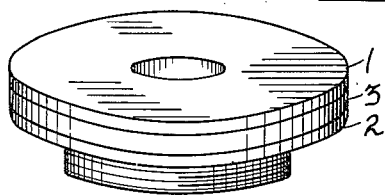
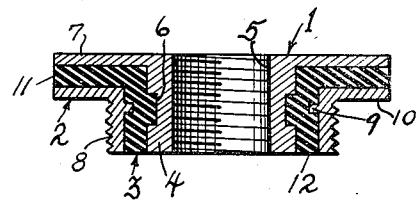
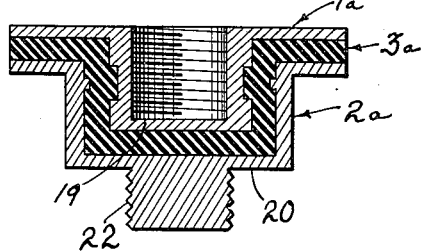
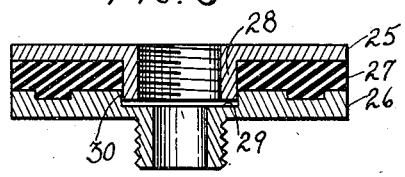
INVENTOR
Arthur William Mall
BY Albert Latta
ATTORNEY Patented Sept. 8, 1942

2,295,282

UNITED STATES PATENT OFFICE 2,295,282

RESILIENT MOUNTING FOR ABRASIVE WHEELS

Arthur William Mall, Flossmoor, Ill.

Application May 31, 1940, Serial No. 337,979

11 Claims. (Cl. 51—168)

My invention relates to a resilient mounting for abrasive wheels.

It has been known heretofore that resilient mountings for grinding wheels are desirable and attempts have previously been made to provide such mountings but the results have been largely unsatisfactory.

It is known, for example, when grinding the rough edges off of iron castings, that sudden increases in torque frequently occur, causing undue wear and strain on the spindle shaft, bearings and gears. It is also known that the life of the gears and other driving parts can be considerably prolonged if a shock absorber is interposed between the grinding and the driving parts.

It is therefore the primary object of my invention to provide a resilient mounting which will act as a shock absorber for the spindle shaft, bearings and particularly the gears.

It is also known that near perfect balance and concentricity must be maintained between the spindle shaft, bearings, grinding wheel and other associated parts.

In maintaining a dynamically balanced condition of the grinding machine when in operation it is highly important that all of these aforementioned parts be in near perfect balance before the machine is assembled. It is also highly important that during the process of assembling these parts, there should be as little distortive strains imposed upon the parts as possible. This factor assures that the balanced condition of the parts before being assembled will be retained after they are assembled.

Accordingly it is another primary object of my invention to provide a resilient mounting which is a separable unit from the other parts of the grinding wheel assembly and which is in near perfect balance prior to its being assembled with the other parts.

An equally important object is to provide a separable resilient mounting which, when assembled with the other parts, is not subjected to any distortive strains such as to cause it to lose its originally balanced condition.

In connection with providing a dynamically balanced grinding machine, it is very important that concentricity be maintained between the grinding wheel and the driving parts during operation of the grinding machine in order to assure a true running grinding wheel.

Accordingly it is another important object of my invention to provide a resilient mounting which will be sufficiently resilient to serve the function of a shock absorber and yet will not be so resilient as to permit deflection of driving alignment between the spindle shaft and grinding wheel during operation.

Other objects and advantages will be apparent upon reading the following description and upon examination of the accompanying drawing forming a part of the specification in which:

Fig. 1 is a side elevational view showing how the resilient mounting is used in attaching a grinding wheel to a spindle;

Fig. 2 is a perspective view of the mounting alone;

Fig. 3 is a sectional view of the mounting alone;

Fig. 4 is a modification showing a resilient mounting which can be used with a grinding wheel having a small center hole;

Fig. 5 is another modification of my invention.

In the preferred embodiment of my invention, I have shown a resilient mounting which is comprised of two metal circular flange members 1 and 2 spaced from each other by means of a similarly shaped rubber bushing 3. The mounting is formed by first machining the metal parts 1 and 2. These metal parts are then placed in a mold in the desired spaced position relative to each other. Rubber is then poured into the predetermined space defined between the metal parts and by a vulcanization process becomes bonded to the surfaces thereof. After the mounting is removed from the mold it is balanced both statically and dynamically.

The metal part 1 is formed with an axially extending hub portion 4 having an internally threaded bore 5 adapted to receive the free end of a spindle shaft or other drive shaft, and a radially extending circular flange portion 7. The outer surface of the hub portion 4 may be provided with an annular recess 6, the reason for which will presently appear. The metal part 2 is also formed with an axially extending hub portion 8 and a radially extending circular flange portion 10. The hub 8 encloses the hub 4 and is spaced therefrom by the rubber bushing 3. On the inner surface of the hub 8 is an annular radially extending shoulder 9 which cooperates with the annular recess 6 to form a sort of locking ring in the rubber bushing 3 which provides additional supporting strength between the rubber bushing and the metal parts.

The rubber bushing 3 is formed of tough rubber ranging from 50 to 60 durometer hardness which in conjunction with the thickness of the walls of the bushing provides a sufficient resiliency to serve as a shock absorber for reducing the amount of shock which is transmitted from the grinding wheel to the driving parts and yet is not so resilient as to permit the abrasive wheel when in operation to be materially deflected from axial alignment with the drive shaft. Although it is apparent that there may be a slight deflection, yet this is not of such significance as to interfere with the smoothness of operation of the grinding wheel.

The wall thickness of the rubber bushing 3 may be from 1/16" to 1/4" but it is to be understood that the mounting may be made in various sizes, in which case the wall thickness of the rubber bushing 3 may vary considerably, as well as the hardness of the rubber.

By referring to Fig. 3 it can be seen that the rubber bushing 3 has, in proportion to its wall thickness, considerable surface area, both radially and axially, which assures a sufficient supporting bond between the rubber and the metal parts 1 and 2. By providing a rubber bushing which has both a radially extending flange portion 11 and an axially extending tubular portion 12, I have, in addition to increasing the bonding strength between the rubber and metal parts, provided a mounting which is more capable of resisting the axial deflection previously referred to.

Referring to Fig. 1 I have shown how the resilient mounting is used to support a cup grinding wheel 14 relative to a driving spindle 15. The spindle shaft 16 is threaded into the bore 5 of the mounting and the abrasive wheel 14 is secured to the spindle by means of a steel insert 17 which is threaded onto the externally threaded hub portion 8 of the mounting. The abrasive wheel is self-tightening relative to the spindle shaft when said shaft is rotated.

It can be seen that the resilient mounting is subjected to a minimum of distortive strains when the mounting and abrasive wheel are assembled to the spindle shaft, consequently the mounting does not lose the static and dynamic balance which it possessed prior to assemblage.

In the modification of my invention shown in Fig. 4 I have provided a mounting which may be adapted to an abrasive wheel with a smaller center hole than the abrasive wheel shown in Fig. 1. I obtain this result by providing each of the metal parts 1a and 2a with base portions 19 and 20. The shank 22 which is preferably integral with the metal part 2a may be machined to any desired size depending upon the size of the abrasive wheel hole. The space defined between the base portions 19 and 20 may be filled with rubber, thereby providing additional supporting strength between the rubber bushing 3a and the metal parts 1a and 2a.

In the modification of my invention shown in Fig. 5 I utilize a different method for controlling the dynamic balance of the abrasive wheel when rotating at high speeds. By using the type of mounting shown in Fig. 5 I am able to increase the flexibility or elasticity of the rubber cushion 24. For some applications it is desirable to increase the elasticity or resiliency of the rubber so as to increase its shock absorbing capacity and so as to give a floating effect to the abrasive wheel.

Consequently, in the construction shown in Fig. 5 I use the two metallic members 25 and 26 which are spaced from each by an annular rubber ring 27. The rubber is bonded to the metallic members in the same manner as heretofore described. The rubber, however, is preferably of 30 to 40 durometer hardness and is, therefore, considerably more elastic than the type of rubber used in the mountings shown in Figs. 3 and 4. However, it should be understood that the rubber used in the mounting shown in Fig. 5 may have a wider range of variance in hardness than the rubber used in the mountings shown in Figs. 3 and 4 and I do not wish to be limited to the use of rubber of 30 to 40 durometer hardness in connection with the mounting shown in Fig. 5. The reasons for the wider range of variance will appear presently.

The metallic member 25 is provided with an axially extending shank portion 28 which is slidably and rotatably received in the annular recess 29 formed in the metallic member 26. The extent of rotation of metal part 25 relative to metal part 26 is of course controlled by the elasticity of the rubber ring 27. There is approximately a .010" clearance, designated at 30, between the exterior wall surface of the shank 28 and the interior wall surface of the recess 29 which permits a "sloppy" fit. This clearance allows a slight deflection of the metal parts 25 and 26 from normal axial alignment and yet the amount of deflection is limited so as not to destroy the necessary dynamic balance of the abrasive wheel when rotated. It is apparent, of course, that the shank portion 28 extends sufficiently far into recess 29 so that when axial deflection does occur the exterior wall of the shank wedges against the interior wall of the recess to prevent further axial deflection. Thus it can be seen that by controlling axial deflection in the manner just described, I may employ the use of comparatively soft rubber and at the same time maintain dynamic balance of the abrasive wheel when rotated. It can also be seen that the hardness of the rubber may vary from 30 to 60 durometer without interfering with the dynamic balance.

The bottom edge of shank 28 is spaced about 3/32" from the base of the recess 29 to allow for axial compression of the rubber ring 27. This space may be varied and I do not wish to be limited to 3/32". The allowance for axial compression of the rubber gives a "floating" effect to the abrasive wheel and the "floating" effect is increased by permitting the slight axial deflection between the metal parts 25 and 26.

Having thus described my invention what I claim is:

1. A resilient mounting for an abrasive wheel comprising a separable unit adapted to be interposed between a rotative drive shaft and an abrasive wheel to establish a driving connection therebetween, said unit including a pair of non-resilient members having a rubber cushion therebetween and bonded thereto, said members and said rubber cushion having axially extending cylindrical portions and radially extending circular flange portions, said rubber cushion having a wall thickness sufficient to reduce the amount of shock transmitted from the abrasive wheel to the drive shaft, but not of such thickness as to permit a material deflection of the abrasive wheel from its normal axial alignment with the rotative drive shaft.

2. A resilient mounting for abrasive wheels and the like comprising a pair of metallic members each having radially extending portions and axially extending portions the axially extending portion of one metallic member being in the form of a cylindrical shank adapted to slidably and rotatably fit into an annular recess formed in the other metallic member, the radially extending portions being spaced from each other by a rubber cushion interposed therebetween, said rubber cushion being of approximately 30 durometer hardness and serving to maintain driving connection between the two metallic members.

3. A resilient mounting as defined in claim 2 wherein axial alingment between the two metallic members is substantially maintained by means of the cylindrical shank slidably fitted into the annular recess.

4. A resilient mounting for abrasive wheels adapted to be interposed between the abrasive wheel and the drive shaft of a power unit comprising a pair of non-resilient members, a resilient rubber-like member interposed between said non-resilient members and establishing driving connection therebetween, one of said non-resilient members having an axially extending shaft portion, the other of said non-resilient members having an opening adapted to slidably and rotatably receive said shaft portion, whereby axial deflection between the two non-resilient members is limited.

5. A resilient mounting as defined in claim 4 wherein a clearance of approximately .010" between the exterior wall of the shaft portion and the interior wall of the opening permits a slight deflection of normal axial alignment between the two non-resilient members.

6. A resilient mounting as defined in claim 4 wherein a clearance between the free end of the shaft portion and the base of the opening permits axial compression of the rubber-like member.

7. A resilient mounting for a surfacing wheel comprising non-resilient members, a resilient member interposed between and bonded to said non-resilient members and establishing a flexible driving connection therebetween, and means additional to the resilient member for limiting deflection of normal axial driving alignment between the driving member and the driven member so as to assure a substantially true running surfacing wheel, said last means including a shaft member extending between the non-resilient members.

8. A resilient mounting for a surfacing wheel interposed between said surfacing wheel and the drive shaft of a power unit comprising non-resilient members, a resilient rubber-like member interposed between said non-resilient members and establishing driving connection therebetween, a shaft portion extending between said non-resilient members, one of said non-resilient members having a recess adapted to slidably and rotatably receive said shaft portion, whereby axial deflection between the two non-resilient members is limited.

9. A cushioning device for interposition between a driving member and a driven member comprising, non-resilient members, a resilient member interposed between said non-resilient members and establishing driving connection therebetween, said resilient member being adapted to permitting deflection of normal axial driving alignment between the driving member and the driven member, and means additional to the resilient member for limiting said deflection so as to assure a substantially true running driven member, said last means including a shaft portion extending from and secured to one of the non-resilient members, and an opening in the other non-resilient member, said shaft portion extending into and slidably and rotatably received in said opening, the limits of slidability and rotation of said shaft portion in said opening being confined within the range of elastic movement of said resilient member.

10. A cushioning device for interposition between a driving member and a driven member comprising non-resilient members, a resilient member interposed between and bonded to said non-resilient members and establishing driving connection therebetween, said non-resilient members having a rotatable and an axially slidable interengagement with each other, whereby deflection of normal axial driving alignment between the driving and driven member is limited, the limits of rotation and axial slidability of said non-resilient members relative to each other being controlled by the elastic movement of said resilient member.

11. A cushioning device for interposition between a driven member and a driving member comprising non-resilient members, a resilient member interposed between said non-resilient members and establishing a flexible driving connection therebetween, means for limiting deflection of normal axial driving alignment between the driving member and the driven member, said last means including a shaft portion extending from and secured to one of the non-resilient members, and an opening in the other non-resilient member, said shaft portion extending into and slidably and rotatably received in said opening.

ARTHUR WILLIAM MALL.